A. McCARTE.
MOLDING MACHINE.
APPLICATION FILED FEB. 13, 1912.
1,134,397.
Patented Apr. 6, 1915.
3 SHEETS—SHEET 2.
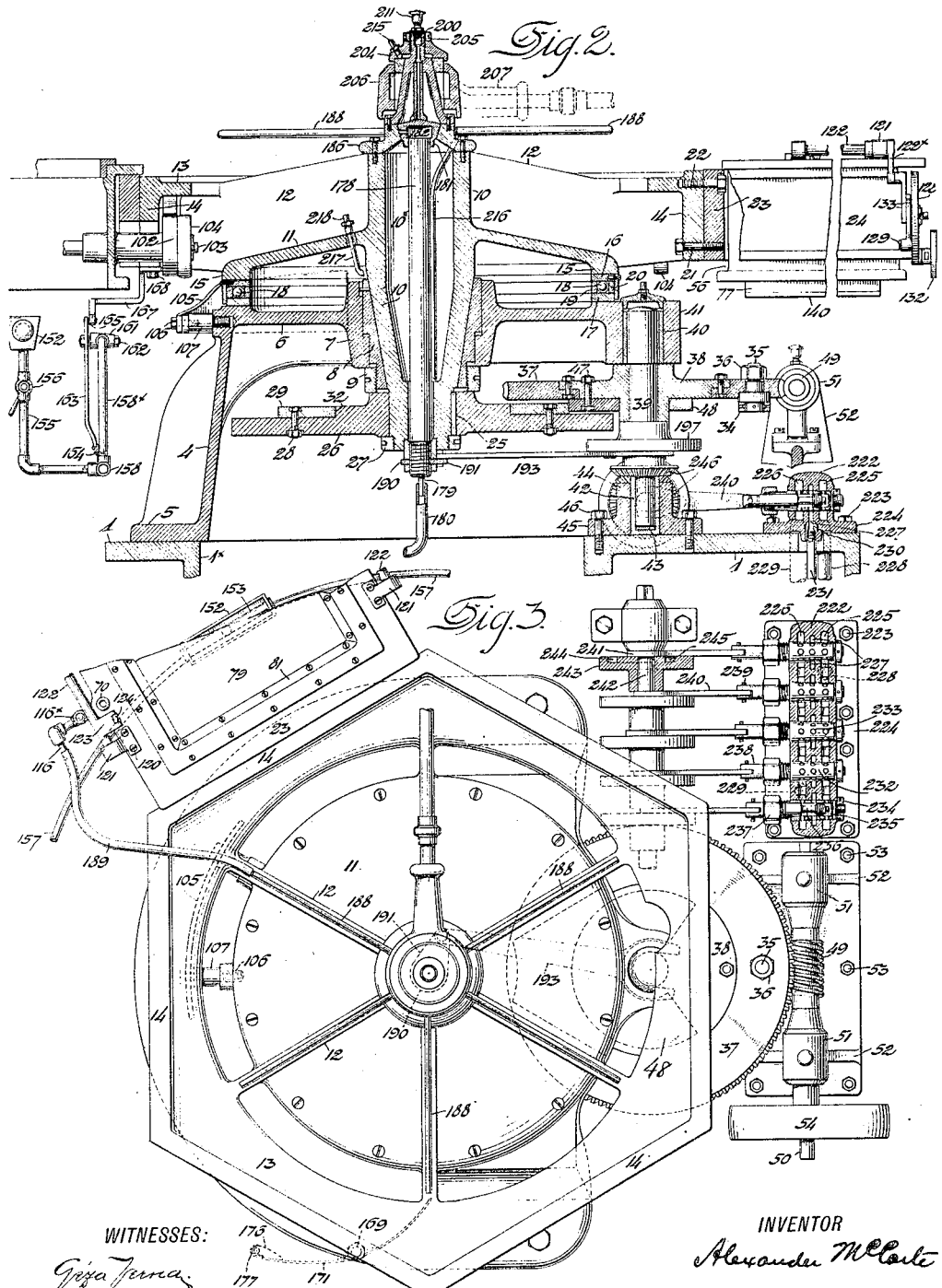
WITNESSES:
INVENTOR
Alexander McCarte
BY
Henry J Miller
ATTORNEY A. McCARTE.
MOLDING MACHINE.
APPLICATION FILED FEB. 13, 1912.
1,134,397.
Patented Apr. 6, 1915.
3 SHEETS—SHEET 3.
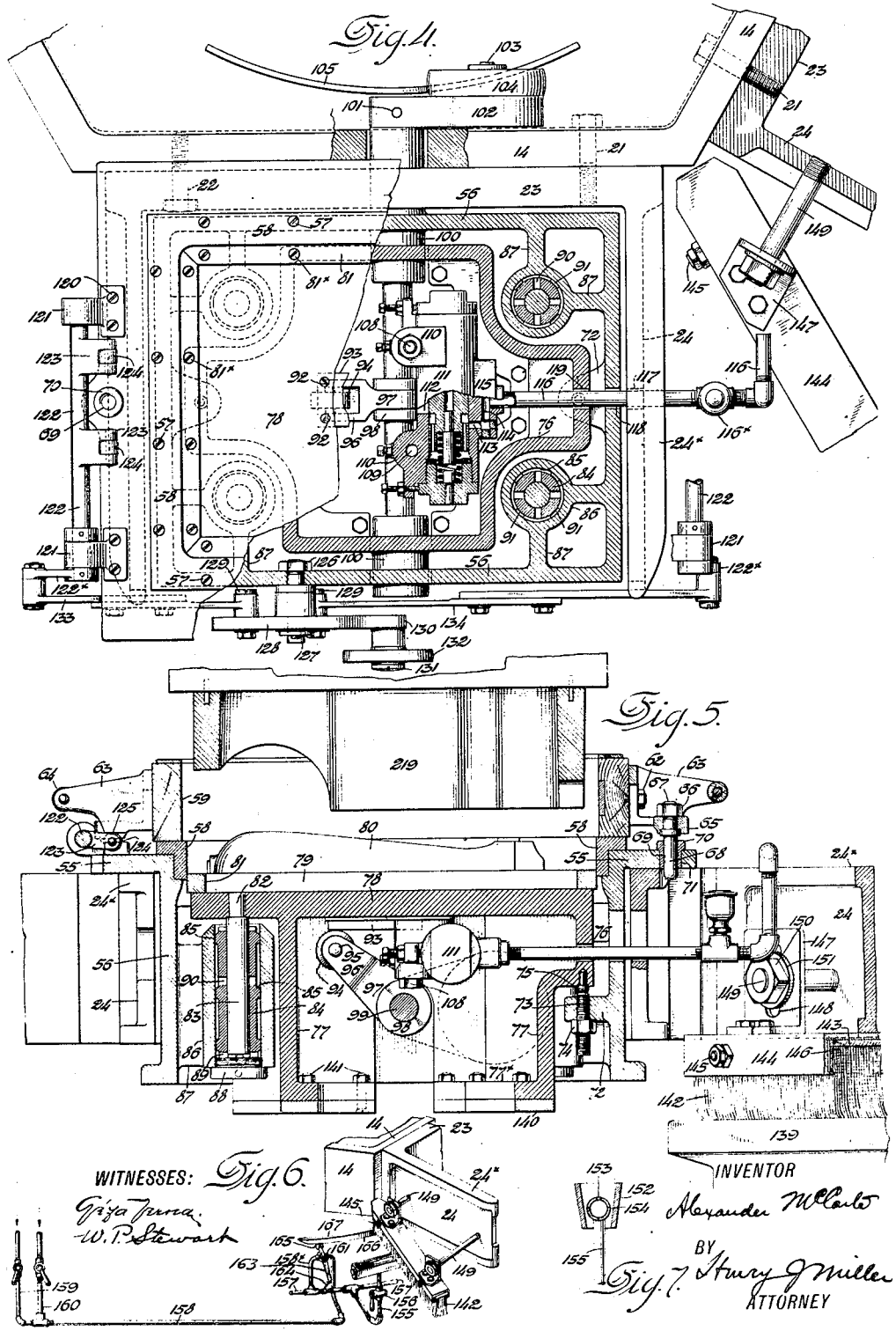

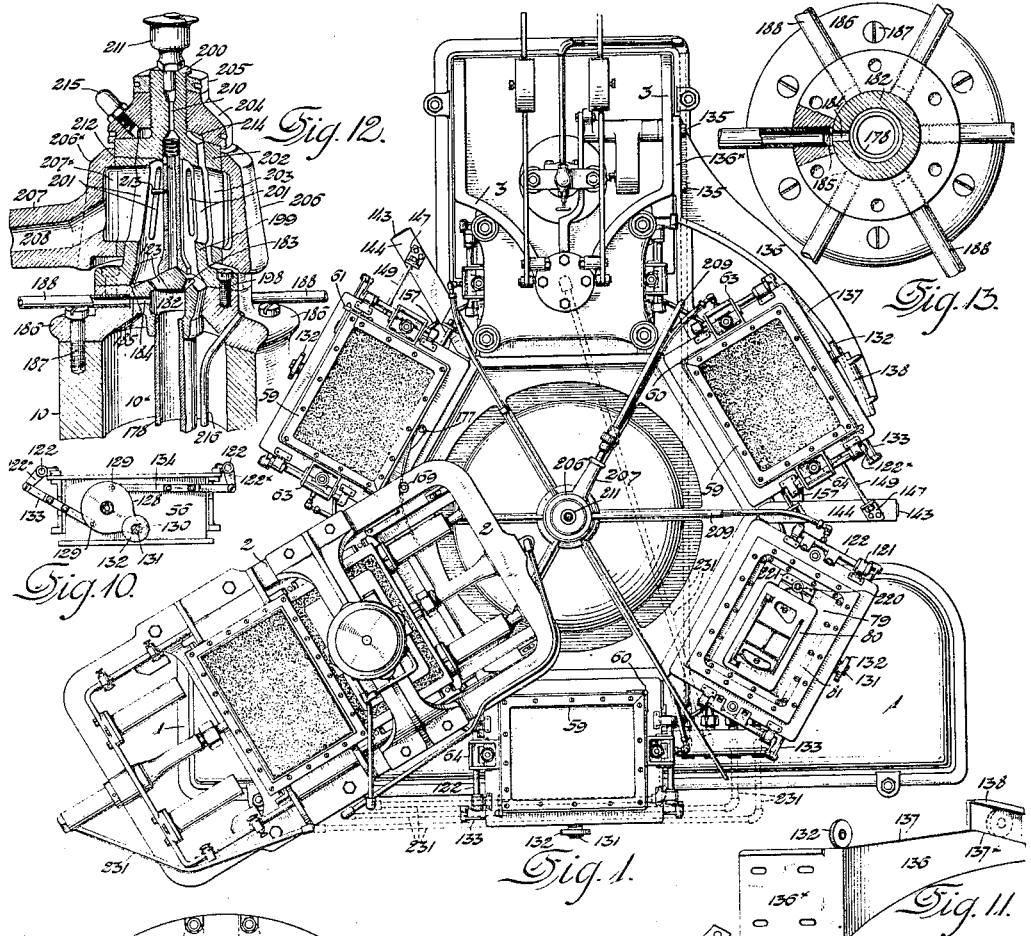

UNITED STATES PATENT OFFICE.

ALEXANDER McCARTE, OF NEWARK, NEW JERSEY, ASSIGNOR TO THE SINGER MANUFACTURING COMPANY, A CORPORATION OF NEW JERSEY.

MOLDING-MACHINE.

1,134,397.  Specification of Letters Patent.  Patented Apr. 6, 1915.

Application filed February 13, 1912. Serial No. 677,331.

*To all whom it may concern:*

Be it known that I, ALEXANDER McCARTE, a citizen of the United States, residing at Newark, in the county of Essex and State of New Jersey, have invented certain new and useful Improvements in Molding-Machines, of which the following is a specification, reference being had therein to the accompanying drawings.

This invention relates to an improvement in that class of sand-molding machines comprising a traveling flask-support with means for imparting to it step-by-step operative movements whereby the movement of a flask supported thereon is arrested at a plurality of stations in each excursion of the support from initial position, combined with successively acting flask-filling, tucking and strike-off means disposed at one of said stations and mold-pressing means disposed at another of said stations.

The present invention has for its chief object to provide an effective flask-support with means for insuring its intermittent travel with fixed periods of rest and effective means for handling the flasks and patterns sustained thereon.

In the preferred embodiment of the improvement, the flask-sustaining means consists of a rotary turret of polygonal form having secured to each side a carrier for the flask which supports also a pattern-carrier movable vertically relatively thereto. A flask and a pattern is mounted each upon its respective carrier at each of the several sides of the turret which are carried successively beneath a sand-filling apparatus and a mold-pressing machine, the molds thus formed being thereafter removed at a succeeding station and replaced by empty flasks for a repetition of the mold-forming operation. The turret is in practice provided with a series of radial channel-ways and intermediate peripheral cavities, the former being entered by a crank-stud upon an actuator provided with a segmental stop member adapted to enter the peripheral cavities of the turret and alternating with the crank-stud in advancing the turret from one station to the next in which it is positively locked for a definite interval until the succeeding advance movement. The flask-carrier is provided with self-lubricating guides for the pattern-carrier mounted therein and with a detachable flask-supporting wearing frame within which is closely fitted the removable wear-plate surrounding the pattern-plate to which the pattern is secured, thus providing for the replacement of the wearing parts operating in contact with the sand. Rock-shafts are mounted at opposite ends of the flask-supports and provided with flask-lifting arms, such rock-shafts being connected for reciprocal movement under the action of a stationary cam member in the approach of each pattern-carrier to mold-removing position and recession therefrom. The turret is provided with cleaning brushes for clearing the top of the press-platen from sand and with pattern-heating burners whose fuel supply is partially interrupted to reduce the size of the flames as the cleaning brushes pass over them. Means are provided for clearing the top of the turret of the superfluous sand dropping on the same from the sand-filling apparatus, and for operating the several pneumatic and hydraulic valves by which various parts of the apparatus are actuated.

In the accompanying drawings, Figure 1 is a plan of the entire structure, including the turret, the sand-filling and sand-pressing means. Fig. 2 is a sectional elevation of the turret and its actuating mechanism, and Fig. 3 a plan of the same, representing also the hydraulic valve mechanism. Fig. 4 is an enlarged partial sectional plan view showing one of the flask-carriers and pattern-carriers and their accessories, and Fig. 5 a sectional elevation of the same. Fig. 6 is a perspective view, upon a smaller scale, of one of the pattern-heating burners and the cleaning brushes with a portion of the turret, and Fig. 7 an enlarged transverse sectional elevation of one of the burners. Fig. 8 is a under side view of the turret-actuating mechanism, with the disk having the channel-ways partly broken away to expose the parts beneath the same; and Fig. 9 a similar view showing the parts in a different position. Fig. 10 is an elevation of the under side of one of the flask-supports, and Fig. 11 an elevation of the bracket containing the controlling cam for the flask-lifter. Fig. 12 is a sectional perspective view of certain air valves at the top of the hollow turret-hub, and Fig. 13 a plan, partly in section, of the same. Figs. 14 and 15 are perspective views showing portions of the frame of the flask-filling apparatus and the turret scraping blade depending therefrom.

As represented in the accompanying drawings, the entire apparatus is mounted upon a common bed-plate 1 formed centrally with a well 1ˣ over which the hub of the turret is arranged, and upon lateral extensions of which bed-plate are mounted the fames 2 and 3 of the flask-filling and mold-pressing apparatus, respectively.

The turret is sustained by the arched base member 4 constructed with the bottom flange 5 secured upon the bed-plate 1 and having the top surmounted by a circular plate 6 with the central internally stepped boss 7 to which is fitted the externally stepped bushing 8 having an externally threaded lower end to which is fitted the threaded thrust-collar 9 by means of which the bushing is drawn downwardly to firmly seat its slightly taper external faces upon those of the boss 7.

The bore of the bushing 8 is upwardly flared to receive the taper external surface of the hollow hub 10 of the turret which has formed integral with said hub the disk 11 and the radial ribs or arms 12 carrying the outer ring 13 somewhat above the disk 11 formed with depending flanges 14 in hexagonal arrangement. The disk 11 has a depending rim 15 having a facing ring 16 between which and a similar facing ring 17 upon the top plate 6 of the base 4 is a series of anti-friction balls 18 confined against lateral displacement by means of the inner and outer rings 19 and 20. To each of the depending flanges 14 is secured by means of the clamp-bolts 21 and 22 the side member 23 of a yoke having parallel end members 24 extending in substantially radial relation with the turret and affording a sustaining member for one of the flask-carriers.

To the cylindrical lower end portion of the turret-hub is secured against turning by means of the key 25 the hub of a disk 26 which is sustained firmly seated against the collar 9 by means of the internally threaded collar 27 applied to the reduced and threaded extremity of the hub 10.

Upon the top of the disk 26 are secured by means of bolts 28 a series of cam-plates 29 having convergent straight edges 30 in substantially radial relation with the turret-hub, concaved inner edge 31 resting against an annular shoulder 32 of the disk 26 and concaved outer edge 33. The nearer straight edges 30 of the adjacent cam plates 29 are spaced apart to form radial channel-ways adapted to be entered successively by a roller 34 journaled upon the depending lower end of a shouldered stud-bolt 35 secured by means of the nut 36 in an aperture in the peripherally toothed outer portion 37 of a sectional worm-wheel whose inner or hub portion 38 is fixed upon the vertical shaft 39 having the upper end journaled within the bushing 40 of a bearing boss 41 extending laterally from the turret-sustaining base-member 4, and whose lower end is journaled in a step bearing afforded by the bushing 42 having in its closed lower end the wearing piece 43 and fitted within the bearing boss 44 having its foot-piece 45 secured by means of screw-bolts 46 upon the bed 1.

To the lower face of the inner worm-wheel section 38 is secured by means of the bolts 47 the segmental cam-disk 48 having a radius of curvature the same as that of the concaved outer edges 33 of the cam-plates 29 and arranged in a position diametrically opposite the stud-bolt 35. The peripheral teeth of the worm-wheel section 37 mesh with a worm 49 fixed upon the driving shaft 50 which is journaled in bearing bosses 51 of a bracket 52 secured by means of screw-bolts 53 upon the bed 1, said shaft carrying the belt-driven pulley 54 by means of which the shaft 50 is driven to impart to the worm-wheel through the worm 49 a continuous rotary motion.

As will be observed, in the position of the parts represented in Fig. 8, the cam-disk 48 fits within the concaved outer edge of one of the cam-plates 29 and thus securely locks the disk 26 of the turret against circular movement. As the worm-wheel continues to rotate, the roller 34 is caused to enter the channel-way between the adjacent edges of two of the cam-plates 29 at the point when one extremity of the cam-disk 48 is in radial relation with both the turret-hub 10 and the shaft 39, as represented in Fig. 8. The continued movement of the worm-wheel carries the roller 34 through a circular arc embracing a portion of the disk 26 and thereby causes the movement of the latter through an angle of, in the present instance, 60°, during which the concavity 33 of the cam-plate 29 recedes from the adjacent edge of the cam-disk 48 to permit the free movement of the disk 26, while the opposite extremity or angle of the cam-disk 48 approaches one extremity of the concavity 33 of the succeeding cam-plate 29, as represented in Fig. 9, which it engages just as the roller 34 emerges from its guideway between the cam-plates. The engagement of the cam-disk 48 with the succeeding cam-plate 29 causes the relocking of the disk, and hence of the turret, against circular movement for another period during which the roller 34 moves around the shaft 39 for entrance into a succeeding channel-way between the cam-plates.

The channel-ways between the cam-plates 29 are so disposed with relation to the roller 34 that a slow starting movement is imparted to the turret, the speed of this movement gradually increasing until the turret approaches stopping position when the roller acts upon the turret with constantly decreasing effect, reducing its momentum to a minimum. Thus the heavy rotary turret is operated by successive, short and comparatively rapid movements and at the same time shock and strain is avoided by permitting the driving elements to gradually overcome the inertia of the motionless turret, in starting the same, and to gradually reduce the momentum of the turret prior to the action of its stopping means.

By the means just described, the turret or flask-support is given an intermittent rotary motion with periods of rest whereby the movement of the flasks supported thereby is interrupted at a plurality of stations corresponding with the number of flasks in each rotation or excursion of the turret from an initial position to its return to the same position, and the means for operating upon the sand in forming the mold are spaced apart at successive stations of the turret where the flasks are locked during certain of their periods of rest.

Each of the parallel yoke members 24 is formed at the top with a lateral flange 24ˣ whose upper face affords a seat for a lateral flange 55 extending outwardly from the top of an open-bottomed rectangular box or casing 56 constituting the flask-carrier and having applied to its upper and inner faces and secured thereto by means of screws 57 the wearing frame 58 of inverted L-shaped cross-section. The upper face of the wearing frame 58 affords a seat upon which rests the open bottom of the snap-flask 59 which is shown herein divided at diagonally opposite corners to one of which is applied the hinge 60 (Fig. 1) and to the other of which is applied a latch device 61 of any well known or suitable construction.

Secured to opposite sides of the flask by means of bolts 62 are handle brackets 63 having the handle pieces 64, the brackets being provided with laterally extending bosses 65 in which are secured by means of clamp-nuts 66 applied to their threaded ends the shouldered bolts 67 having depending steady-pins 68 entering suitable eyes 69 in bushings 70 within apertures 71 formed in the lateral flanges 55 of the flask-carrier. As the embodiment of the present improvement shown and described herein is designed for producing two-part molds requiring alternate operation upon the cope or upper flask-section and the drag or lower flask-section, respectively, the steady-pin 68 and the eye for receiving it are in practice inversely arranged in the different flask sections for interengagement when the sections are brought together to form the complete mold, and the lateral flanges 55 of the successive flask-carriers are correspondingly arranged for maintenance of the flask-sections against displacement in the mold-forming operations.

The flask-support 56 is provided upon the opposite faces of its inner wall with inwardly extending lugs 72 having threaded apertures to which are fitted the bearing screws 73 having jam-nuts 74 and upon whose upper ends rest the heads of bearing pins 75 carried by lateral extensions 76 of a hollow box 77 constituting the pattern-support whose closed upper end 78 affords a flat seat for the pattern-plate 79 to which the pattern section 80 is secured. Upon the margin of the pattern-supporting plate 78 is secured by means of screws 81ˣ the rectangular wear-plate 81 whose outer faces are fitted loosely to the adjacent faces of the wear-frame inclosing the same, and to whose inner faces the adjacent edges of the pattern-plate 79 are fitted.

The pattern-supporting plate 78 has formed therein at a point near each of its four corners an aperture in which is secured the reduced upper end 82 of a depending plunger-rod 83 fitted within a bushing 84 formed with annular bearing ribs 85 which are themselves fitted within a tubular bearing boss 86 rigidly connected with the adjacent walls of the box or casing 56 by means of the wings 87 cast integrally therewith. The lower end of the boss 86 is closed by means of a screw-plug 88, but it is open at the upper end, and the bushing 84 is formed at the lower end and intermediate the ends with transverse apertures 89 and 90 to establish communication between the interior and exterior of the bushing, and the annular ribs 85 are interrupted at several points around the circumference to form shallow channels 91 to establish communication between the upper and lower ends of the bearing boss 86. The bushings 84 not only afford guides for the plungers 83 to properly direct the pattern-carrier in its vertical movements, but, the otherwise vacant space within the bearing boss 86 being filled with heavy oil or other liquid, they serve to provide lubricant to insure the free movement of the pattern-carrier.

To the lower face of the pattern-supporting plate 78 is secured by means of screws 92 the wearing plate 93 against the lower operative face of which rests the roller 94 mounted on a transverse pin 95 in the forked outer end 96 of a crank-arm 97 whose hub 98 is fixed upon the rock-shaft 99 mounted in transversely arranged bearing bosses 100 of the flask-supporting casing 56. The rock-shaft 99 has fixed upon its outer end by means of the pin 101 one end of a lateral crank-arm 102 whose outer end carries a headed journal-pin 103 upon which is mounted the weighted roller 104. When the pattern-carrier moves upwardly under the action of the ram from the initial position represented in Figs. 4 and 5, in the mold-compressing operation, the weight of the roller 104 turns the rock-shaft 99 to bring the roller 94 directly above said rock-shaft so as to detain the pattern-support in its advance position with the upper faces of the wear-plate 81 and pattern-plate 79 flush with the top of the wearing frame 58 and the bottom of the flask 59. The pattern-carrier is maintained in this elevated position until the turret performs its next partial rotation, when the weighted roller 104 encounters the upwardly inclined operative edge of a stationary cam-plate 105 secured by means of stud-bolts 106 and spacing bushings 107 to the rim of the plate 6 of the turret-sustaining base-member, by means of which the arm 102 is gradually raised to turn the rock-shaft 99 and thereby swing the crank-arm 97 laterally to cause the detaining roller 94 to assume its lower position, thereby permitting the pattern-support to descend by gravity to initial position.

As before indicated, the pattern 80 is rigidly secured to the pattern plate 79 resting upon the supporting plate 78 of the carrier 77 and confined against lateral movement thereon by contact with the adjacent walls of the wear-plate 81. To facilitate the disengagement of the pattern from the finished mold without injury of the same during the retraction of the pattern-support, the plate 78 has rigidly secured to its lower side a pneumatically actuated vibrator or jarring device by means of bolts 108 entering apertures 109 in lugs 110 of the cylinder 111. The vibrator-cylinder has fitted within the same a reciprocating plunger of well known construction and is provided in one side with the exhaust port 112 and in the opposite side with two spaced inlet ports 113 connected by a channel 114 in the projecting boss 115, the inlet channel being connected with the air-supply pipe 116 entering slots 117 and 118 formed to receive the same in the yoke member 24 and flask-support 56, and passing through an aperture 119 in the side wall of the pattern-support. The admission of air to the vibrator-cylinder through the supply-pipe 116 during and subsequent to the mold-compressing operation produces sufficient jarring of the parts to prevent adherence of particles of sand to the pattern when the latter is lowered from the interior of the flask section.

The flange 55 of the flask-support has secured upon its upper face, at opposite ends thereof, by means of screws 120 the bearing blocks 121 in which are journaled the parallel rock-shafts 122 each provided intermediate its ends with a pair of forked lateral flask-lifting arms 123 extending upon opposite sides of the bushing 70 and each carrying a roller 124 lying intermediate the flask-support flange 55 and a flat seat 125 of the handle-bracket 63.

The flask-support or carrier has secured in its forward side by means of the nut 126 the shouldered fulcrum-stud 127 upon which is mounted the crank-plate 128 carrying near the periphery the substantially diametrically disposed crank-pins 129 and formed with a lateral extension 130 provided with a crank-stud 131 upon which is journaled the roller 132. Each of the flask-lifting rock-shafts 122 is provided at its forward end with a depending crank-arm 122ˣ which is connected by means of the extensible pitmen 133 and 134 with the crank-pins 129 of the crank-plate 128. The parts are so arranged and proportioned that the crank-plate acts by gravity to maintain the lifting arms 123 in their lowered positions.

Secured to the frame 3 of the mold-pressing apparatus by means of fastening bolts 135 is the foot 136ˣ of the laterally extending bracket 136 constructed with an upwardly extending rib whose upper edge 137 is upwardly inclined relatively to the path of travel of the turret, and by engagement with the roller 132 causes the rocking of the shafts 122 and the forcible engagement of the lifting rollers 124 with the handle-brackets 63 so as to lift the flask for removal by the attendant in the movement of the turret following a mold-compressing operation. The cam-edge 137 is provided near its forward end with a downwardly inclined portion 137ˣ, and the web of the bracket 136 is provided with an overhanging lip 138 whose lower face serves to confine the roller between itself and the cam portion 137ˣ to insure the retrograde movement of the crank-plate in the initial travel of the flask-carrier from the flask-removing station, thereby causing the depression of the flask-lifting arms 123 for reception of the flask section for a succeeding mold-forming operation thereon.

As represented more fully in my application Serial No. 602,354, filed January 12, 1911, the mold-compressing apparatus includes a hydraulic-cylinder having a platen 139 normally disposed slightly below the path of circular movement of and in register with the facing plate 140 which is secured by the bolts 141 to the inwardly extending flange 77ˣ of the pattern-supporting box or casing 77. It is obviously desirable to keep the operative face of this platen free from sand, and to this end the turret is preferably provided with a series of depending brushes disposed intermediate the adjacent flask-carriers, and each comprising bunches of bristles 142 secured in the wooden backings 143 which are clamped within the channeled holders 144 by means of the stud-bolts 145 and interposed wearing strips 146. Each of these holders is secured to an angle-piece 147 one of whose members is formed with a slot 148 entered by the reduced outer end of the shouldered stud-bolt 149 tapped into the side of the pattern-supporting member 56 and secured in its vertical adjustment by means of the nut 150 and washer 151.

Beneath each pattern-supporting member 78 in its position of rest between turret actuations is disposed a heating burner comprising a flaring rectangular casing 152 open at the bottom within and longitudinally of which is secured the burner-tube 153 with lateral jet apertures 154. Each of the tubes 153 is connected with an upright feed pipe 155 provided with a stop-cock 156 and connected with the delivery-pipe 157 in practice extending entirely around the turret. Connected with the delivery-pipe 157 is the supply-pipe 158 in communication with the valved air-supply and fuel-supply pipes 159 and 160, respectively, by means of which air and gas may be mixed for delivery to the several burners, the mixture being regulated by the valves in said pipes, as shown in Fig. 6. The air supply pipe 158 is formed with a loop 158ˣ containing a regulator valve 161 whose stem has secured thereon the lever 163 normally held in upright position, to maintain the valve open, by means of a spring 164 attached to the pipe 157 or some other stationary part. The upper arm of the lever 163 carries a roller-stud 165 adapted for engagement with the lower operative edge 166 of a cam-bar 167 secured by means of a bolt 168 upon the lower edge of the flange 14 adjacent each of the cleaning brushes 142. The parts are so arranged and proportioned that the lever 163 is tilted in opposition to its spring 164, as represented in Fig. 6, just as the brush 142 approaches the burner, the former being so reduced that the bristles are not scorched in their passage over the same between stations.

Secured upon the frame 2 of the flask-filling apparatus overhanging the turret is the shouldered depending stud-pin 169 upon the lower end of which are journaled the bearing pieces 170 attached to the scraper-blade 171 to the lower margin of which is secured by means of bolts 172 the wearing strip 173 of leather or other flexible material. A spring 174 surrounding the stud-pin 169 serves to maintain the scraper yieldingly in inclined relation with the adjacent flange 14 of the turret, with its body portion 171 in engagement with a stop-pin 175 depending from the stationary frame 2. At one end of the blade 171 is secured the bearing bracket 176 carrying the anti-friction roller 177 which is adapted in practice for engagement with the inner side of the flask 59 in the travel of the latter between stations, thereby deflecting the scraper and preventing its disarrangement by moving parts of the machine. As represented in Fig. 1, the scraper is so disposed that in the travel of the turret it serves to eject from the top of the same between the adjacent corners of the flask-carriers any sand which is spilled from the filling apparatus in striking off the residue from the flask after each filling operation.

The turret-hub 10 is formed with the central cavity 10ˣ through which passes the axially arranged tubular valve-stem 178 having in its otherwise closed lower end the nipple 179 connected with the compressed air supply pipe 180. Secured upon the externally threaded upper end of the valve-stem 178 is the hub 181 of the hollow conical valve-plug 182 formed in its upper end with the divergently inclined apertures 183 and having a single radial aperture 184 adapted for communication successively with a series of radial ports 185 of a conical valve-seat afforded in the center of the cap-plate 186 secured by screws 187 upon the top of the turret-hub 10. In each of the ports 185 is introduced one end of a radial air pipe 188 to whose opposite end is connected one end of a flexible hose 189 having its other end attached to the air pipe 116 leading to the inlet chamber of the cylinder 111 of the pattern vibrator or jarring device, and shown provided with the oil-cup 116ˣ.

Fixed upon the externally threaded lower end portion of the tubular valve-stem 178 is the hub 190 of a crank-arm 191 pivotally connected by means of the pin 192 with one end of a link-bar 193 having its opposite end 194 formed to embrace the worm-wheel shaft 39 and having a roller-stud 195 entering a cam-groove 196 in the cam-wheel 197 which is fixed upon the worm-wheel shaft. The rotation of the cam-wheel 197 with the shaft 39 causes the link-bar 193 to turn the valve-stem 178 so as to open the air valve just about as the press-platen 139 commences to rise for a mold-compressing operation, and to maintain the valve open until about the time that the pattern is withdrawn from the mold by the descent of the pattern-carrier, during all of which period the vibrator is kept in operation to jar the pattern so as to prevent adherence of particles of sand thereto. The cam-groove 196 is so shaped as to compensate for the advance of the turret during the desired period of operation of the vibrator, and this period may be varied in length by adjustment of the crank-arm 191 upon the hollow valve-stem 178.

Fixed upon the top of the cap-plate 186 by means of screws 198 is a conical valve-plug 199 having upwardly extending externally threaded nipple 200 and provided with a series of radial ports 201 corresponding in number and arrangement with the flask-carriers of the turret. Fitted upon the conical exterior of this valve-plug and affording a seat therefor is the bushing 202 provided with a series of radial ports 203 corresponding in number and spacing with those of the valve-plug 199, this bushing being confined in position by means of a cap 204 having an internally threaded aperture applied to the nipple 200 and secured in position thereon by means of the lock-nut 205. Fitted upon and fixed to the exterior of the bushing 202 is the hollow hub 206 of a tubular socketed arm 207 having its central aperture 208 in communication with the chamber 207* in the hub surrounding the ports 203 of the bushing 202.

The socket of the arm 207 has secured therein one end of a blow-off pipe 209 which is in practice led laterally to a position somewhat in advance, in the direction of the turret rotation, of the press-platen, where it is in practice provided with a downwardly extending nozzle for clearing the sprue-hole as a finished mold passes beneath the same to mold-removing position. The ports 201 and 203 are so proportioned and arranged that the blow-out valve is closed while the turret is at rest, but is open while each finished mold is passing from the compressing to the removing station, the blow-out pipe being maintained stationary at all times and the step-by-step rotation of the valve-plug 201 with the turret serving to open and close the ports as described. As shown in the drawings, the nipple 200 is provided with an axial oil duct 210 having an internally threaded socket at the upper end in which is screwed the oil-cup 211 which supplies oil to the valve-plug 182 by means of the tube 212 whose lower end is seated upon the conical upper face of the valve-plug 182 and which is prevented from turning therewith by means of the radial pin 213 extending from the same into a suitable aperture in the fixed valve-plug 199, which is itself provided with oil from an annular cavity 214 supplied through an oil hole closed by the screw-plug 215.

As shown in Figs. 2 and 12, the bearing of the valve-stem 178 in the lower portion of the turret-hub is lubricated by means of the bent pipe 216 extending from the cap-plate 186 downwardly through the central cavity 10* of the turret-hub 10. As a convenient means of lubricating the conical bearing of the turret-hub 10 in the bushing 8, the inclined oil-pipe 217 is secured in the disk 11 of the turret and is normally closed by means of the cap 218.

As shown and described more fully in an application Serial No. 677,332, filed February 13, 1912, filed simultaneously herewith, the flask-filling apparatus comprises a sand-hopper, a reciprocating sand-box movable from a position beneath the same to a position at the side thereof and directly above the flask to be filled and provided with a relatively movable bottom, these several parts being actuated by means of hydraulic rams, as well as the tucker 219 which descends to pack the sand around the pattern previous to the retraction of the sand-box to strike off the superfluous sand from the flask. As before stated, the press-platen 139 is actuated by a hydraulic ram, as is also the sprue-plug which descends through the upper flask section into the sprue-socket 220 of the pattern-gate 221 (see Fig. 1). To effect the actuation of these several hydraulic rams in the proper relative timings, a valve mechanism is employed which derives its operative movements from a connection with the turret actuator. As represented in Figs. 2 and 3, the hydraulic valve-chest 222 is secured upon the bed-plate 1 by bolts 223 passing through its feet 224. This valve-chest is formed with longitudinal supply and exhaust chambers 225 and 226, respectively, and an intermediate series of independent distributing chambers 227. The supply and exhaust chambers are connected respectively with the supply and exhaust pipes 228 and 229 tapped into the bottom of the casing, and each of the distributing chambers is connected at the lower side with a pocket 230 in communication with one of a series of distributing or service pipes 231 also leading from the bottom of the valve-chest; these service pipes being led to the different parts of the apparatus, as represented in plan in Fig. 1. The casing is provided with a series of transverse slightly tapered apertures each arranged centrally of one of the distributing chambers 227 in which is fitted a tubular valve seat 232 of corresponding taper form exteriorly but having a cylindrical inner face communicating with the chambers 225, 226 and 227, respectively, by means of the annular series of apertures 233. The tube 232 is maintained firmly seated in its aperture in the chest by means of the nut 234 applied to its closed end, and within the tube 232 is fitted the piston 235 whose stem 236 is passed through a suitable stuffing box 237 and provided with a forked head 238 in which is secured by the pin 239 one end of the link-bar 240 whose forked opposite end portion 241 embraces the cam-shaft 242 upon which are secured the several actuating cam-wheels 243 each having a cam-groove 244 entered by a lateral stud 245 of the link-bar 240. The cam-shaft 242 is connected by a pair of bevel-gears 246 with the worm-wheel shaft 39 from which it derives its operative movements.

As will be readily seen, the rotation of the cam-shaft 242 causes the reciprocation of the valve pistons 235, whereby communication is established alternately between the central distributing chambers and the supply and exhaust chambers, respectively, thereby controlling the supply of liquid in the distributing pipes 231 for producing the requisite operations of the several members of the sand-manipulating and compressing apparatus.

The operation of the device is as follows: The turret being in the position shown in Fig. 3, power is applied to shaft 50 by means of the pulley 54, the worm-wheel 37 being thereby rotated by means of worm 49, thus rotating the turret until the roller 34 is disengaged from one of the channel-ways formed by the cam-plates 29, as seen in Figs. 8 and 9. At this point the turret is held against further rotation by the cam-disk 48 which engages the concaved outer edge of one of the cam-plates 29. By such rotation of the turret one of the flask-carriers 56 supported thereon and carrying a flask 59 is placed under and registers with a flask-filling apparatus, which forms no part of the present invention but which is indicated by numeral 2, Fig. 1. At this point the said flask-filling apparatus is operated by means of certain hydraulic rams automatically actuated by the valve mechanism shown in Figs. 2 and 3 which derives its movements through connections with the worm-wheel 38, as hereinafter described with respect to the hydraulic press. After the flask has been filled and the sand evenly distributed over the pattern by means of a tucking member forming part of said flask-filling device, the roller 34 meets the succeeding channel-way in the turret-disk and the turret is revolved another step, carrying the filled flask beneath a hydraulic press which, also, forms no part of the present invention but which is indicated in Fig. 1 by numeral 3. As the flask is presented under the hydraulic press, the cam-shaft 242, operated by the worm-wheel 38 through the intermediaries shown in Figs. 2 and 3, causes reciprocation of the valve pistons 235 and liquid is admitted through service pipes 231 (Fig. 1) to said hydraulic press, thus operating the press-platen. As the press-platen commences to rise for a mold-pressing operation, a valve-stem 178, mounted within the turret-hub, is turned through the intermediary of the link-bar 193 and cam-wheel 197, which permits air to flow through radial air pipe 188 to the vibrator 111, mounted within the pattern-carrier 78, as shown in Figs. 3 and 4. Said vibrator is actuated until about the time the pattern is withdrawn from the mold by the descent of the pattern-carrier as hereinbefore described, its function being to facilitate the disengagement of the pattern from the finished mold. After the press-platen has raised the pattern-carrier 78 in pressing the mold and has retracted therefrom, said pattern-carrier is retained in its upward position by means of detent-arm 96 which is automatically raised into operative position by means of weighted arm 102, as seen in Figs. 4 and 5. After the operation of the hydraulic-press and the gate-forming mechanism carried thereby, the roller 34 of the worm-wheel 37 meets the succeeding channel-way in the turret-disk and the turret is rotated another step. During such partial rotation the detent-arm is released by the contact of a roller on weighted arm 102 with an upwardly inclined cam-plate 105 (Fig. 2). In the meantime the platen of the hydraulic-press has been freed of sand by one of the brushes 144 disposed between the advancing flask-carrier and the succeeding flask-carrier, as shown in Figs. 4 and 5; and the pattern-support 78 has been maintained in heated condition by means of a series of burners disposed beneath the path of the flask-carriers. As the brushes 144 meet a burner and pass over the same, the flame is diminished by the engagement of a cam-bar 167 with regulator-valve lever 163 of the burner. At the end of the turret movement which carries the flask and its support away from the hydraulic-press, the flask is automatically lifted from its support and the pattern, and the steady pins 68 partially disengaged from their sockets 69, by the engagement of roller 132 (Fig. 4) with an upwardly inclined bracket 136 (Fig. 1), which elevates said roller to operate rock-shafts 122, the lifting arms 123 of which engage the flask. At this point the flask with its completed mold section is lifted from the carrier and an empty flask substituted therefor.

While I have shown and described specifically herein the preferable manner in which the present invention is carried into effect, it is evident that the improvement is susceptible of very material modification in the construction and arrangement of its parts, and that various ones of its several features may be omitted or modified individually without departure from the scope of the invention.

Having thus set forth the nature of the invention, what I claim herein is:—

1. In a molding machine, the combination with a support, of a flask-sustaining carrier mounted for rotary movement upon said support and driving means for said carrier comprising a continuously moving actuator, means supported by the carrier and engaged by the actuator whereby the carrier is given intermittent rotary movements beginning with gradually increased speed and ending with gradually decreased speed, and turret detaining means carried by said actuator whereby the carrier is periodically locked against movement.

2. In a molding machine, the combination with a flask-sustaining turret provided with a series of radial channel-ways and intermediate peripheral cavities, of an actuator for the same carrying a crank-stud adapted to enter successively said channel-ways and provided with a segmental stop member arranged upon the opposite side of its axis of movement from said crank-stud and having a periphery adapted to enter said cavities of the turret and to temporarily detain the latter from turning.

3. In a molding machine, the combination with a flask-sustaining turret, of a disk rigidly connected with the same and provided with a series of segmental plates spaced apart to form radial channel-ways and formed with arcuate cavities in and centrally of their outer edges, an actuator carrying a crank-stud moving in a path intersecting said channel-ways and provided with a segmental stop member arranged diametrically opposite said crank-stud and having a periphery corresponding in curvature with that of said cavities, and means for imparting operative movements to said actuator.

4. In a molding machine, the combination with a flask-sustaining turret provided with a series of radial channel-ways and intermediate peripheral cavities, of an actuator for the same in constant engagement therewith, carrying a member adapted to enter successively said channel-ways, and also a member to enter successively said peripheral cavities, to intermittently turn and to intermittently hold said turret in fixed position, substantially as shown and set forth.

5. In a molding machine, the combination with a support, of a plurality of flask-sustaining carriers mounted upon said support and each provided with a plurality of parallel tubular sockets, bushings fitted within said sockets and provided with central guiding apertures and with external oil-ducts having connections with the central apertures, and pattern-carriers each sustained by one of the flask-carriers and provided with a plurality of depending plungers entering the guide-apertures of said bushings.

6. In a molding machine, the combination with a support, of a plurality of flask-sustaining carriers mounted upon said support and each provided with a plurality of parallel tubular sockets open at the upper ends, bushings fitted within said sockets and each provided with a central guiding aperture and with external oil-ducts having connections with the central aperture at different points in the latter's length, and pattern-carriers each sustained by one of the flask-carriers and provided with a plurality of depending plungers entering the guide-apertures of said bushings.

7. In a molding machine, the combination with a support, of a flask-sustaining carrier mounted upon said support, a pattern-carrier sustained by and movable vertically relative to said carrier, a weight-actuated detainer for maintaining the pattern-carrier in elevated position, and means for gradually lifting the actuating weight of said detainer whereby the pattern-carrier is caused to descend.

8. In a molding machine, the combination with a support, of a flask-sustaining carrier mounted upon said support, a pattern-carrier sustained by and movable vertically relative to said carrier, a rock-shaft mounted within the flask-sustaining carrier beneath the pattern-carrier, a crank-arm mounted upon said shaft and having its outer end adapted for engagement with the pattern-carrier for sustaining the same in elevated position, a weighted arm fixed to said shaft upon the side thereof opposite said crank-arm, and means for elevating said weighted arm to rock said shaft for the release of the pattern-support from elevated position.

9. In a molding machine, the combination with a support, of a flask-sustaining carrier mounted upon said support, a pattern-carrier movable vertically relative to said flask-carrier, a removable wearing frame carried by said flask-carrier, and a removable wearing frame carried by said pattern-carrier and engaging the inner walls of the aforesaid wearing frame, substantially as shown and described.

10. In a molding machine, the combination with a flask-support, and a flask mounted thereon, of a plurality of rock-shafts provided with flask lifting means mounted upon said support, a crank-plate mounted upon said support, connections between said crank-plate and rock-shafts, and means intermittently engaging said crank-plate whereby the same is automatically actuated to lift said flask and is automatically and positively actuated to retract said flask lifting means.

11. In a molding machine, the combination with a flask-support, of a flask, steady pins attached to said flask and entering sockets formed in the flask-support, parallel rock-shafts mounted upon said support and each provided with a crank-arm engaging said flask at points adjacent said steady pins, a crank-plate mounted upon said support, crank-and-pitman connections between said crank-plate and said rock-shafts and means intermittently engaging said crank-plate whereby the same is automatically actuated to lift said flask and is automatically and positively actuated to retract said crank arms.

12. In a molding machine, the combination with a flask-support, of a flask, steady pins attached to said flask and entering sockets formed in the flask-support, parallel rock-shafts mounted upon said support and each provided with a crank-arm engaging said flask at points adjacent said steady pins, a crank-plate mounted upon said support, crank-and-pitman connections between said crank-plate and said rock-shafts, and actuating means automatically operating at predetermined intervals for actuating said crank-plate.

13. In a molding machine, the combination with a flask-sustaining turret, a plurality of flask-carriers mounted thereon, and pattern-carriers sustained by said flask-carriers, of a pneumatic vibrator secured to each of said pattern-carriers, an air-valve mounted upon said turret having one member rotating with the turret and provided with a series of radial ports, a non-rotating valve member co-acting with said rotating member, connections between said ports and the several vibrators, and automatically acting means for operating said air-valve.

14. In a molding machine, the combination with a rotary flask-sustaining turret, a plurality of flask-carriers mounted thereon, and pattern-carriers sustained by said flask-carriers, of a pneumatic vibrator secured to each of said pattern-carriers, an air-valve mounted upon said turret having one member rotating with the turret and provided with a series of radial ports, a co-acting valve member adapted to oscillate within said rotating member, connections between said ports and the several vibrators, and automatically acting means for operating said air-valve.

15. In a molding machine, the combination with a rotary flask-sustaining turret, a plurality of flask-carriers mounted thereon, and pattern-carriers sustained by said flask-carriers, of a pneumatic vibrator secured to each of said pattern-carriers, an air-valve mounted upon said turret and connected with the air-supply, connections between said air-valve and the several vibrators, and means including an opera. element extending axially through said turret for operating said air-valve.

16. In a molding machine, the combination with a rotary flask-sustaining turret constructed with a hollow hub surmounted by a cap having an axial valve seat and a plurality of ports leading therefrom, a plurality of flask-carriers mounted upon said turret, and pattern-carriers sustained by said flask-carriers, of a pneumatic vibrator secured to each of said pattern-carriers, connections between said vibrators and said ports of the turret-cap, a rotary valve-plug applied to the valve-seat of said cap, an axial valve-stem connected with said valve-plug, valve-operating means connected with said stem, and a connection between said valve-plug and the air-supply.

17. In a molding machine, the combination with a rotary flask-sustaining turret constructed with a hollow hub surmounted by a cap having an axial valve seat and a plurality of ports leading therefrom, a plurality of flask-carriers mounted upon said turret, and pattern-carriers sustained by said flask-carriers, of a pneumatic vibrator secured to each of said pattern-carriers, connections between said vibrators and said ports of the turret-cap, a hollow rotary valve-plug having a port adapted to register successively with those of said turret-cap, an axial tubular valve-stem connected with said valve-plug and with the air-supply, and valve-operating means connected with said stem.

18. In a molding machine, the combination with a rotary flask-sustaining turret constructed with a hollow hub, of a cap surmounting the same and having an axial valve-seat and a plurality of ports leading therefrom, a fixed hollow valve-plug arranged above said valve-seat and provided with a lateral port adapted to be successively opened and closed for delivery of a supply of air therefrom, a hollow rotary valve-plug having a port adapted to register successively with those of said turret-cap, and a second port communicating with the interior of the superposed fixed valve-plug, an axial tubular valve-stem connected with said valve-plug and with the air-supply, and valve-operating means connected with said stem.

19. In a molding machine, the combination with a rotary flask-sustaining turret constructed with a hollow hub, and means for imparting to said turret step-by-step turning movements, of a cap surmounting said turret and having an axial valve-seat, and a plurality of ports leading therefrom, a fixed hollow valve-plug sustained by said turret above said valve-seat and provided with a lateral port, a stationary casing surrounding the fixed valve-plug and provided with a normally closed port adapted to register with that of the fixed valve-plug, a hollow rotary valve-plug having a port adapted to register successively with those of said turret-cap, and a second port communicating with the interior of the superposed fixed valve-plug, an axial tubular valve-stem connected with said valve-plug and with the air-supply, and valve-operating means connected with said stem.

20. In a molding machine, the combination with a rotary flask-sustaining turret constructed with a hollow hub, and means for imparting to said turret step-by-step turning movements, of a hollow valve-plug sustained by and movable with said turret and having its interior in communication with the hollow hub of said turret and provided with a lateral port, a stationary casing surrounding said valve-plug and provided with a normally closed port adapted to register with that of the fixed valve-plug, and a connection between the hollow turret-hub and the air-supply.

21. In a molding machine, the combination with a rotary flask-sustaining turret, and driving means therefor comprising a continuously moving actuator carrying turret-detaining means whereby the turret is periodically locked against movement, of a hydraulic valve-chest containing independent inlet, exhaust and delivery chambers, a valve for establishing connection between the distributing chamber and the inlet and exhaust chambers, respectively, and valve-operating means connected with and actuated by the turret-actuator.

22. In a molding machine, the combination with a rotary flask-sustaining turret, and driving means therefor comprising a continuously moving actuator carrying turret-detaining means whereby the turret is periodically locked against movement, of a hydraulic valve-chest provided with an inlet chamber, an outlet chamber, and an intermediate series of independent distributing chambers, a valve for establishing connection between each of the distributing chambers and the inlet and exhaust chambers, respectively, and means connected with and actuated by the turret-actuator and adapted for independently operating the said valves synchronously with the rotary movements of the turret.

23. In a molding machine, the combination with a rotary turret, a plurality of pattern plates mounted thereon and means for imparting to said turret step-by-step rotary movements, of a series of heating burners each disposed beneath one of said pattern plates in the intervals between movements of the turret, fuel supply pipes connected with said burners, and automatically acting means rendering said burners ineffective during the travel of the turret.

24. In a molding machine, the combination with a rotary turret, a plurality of pattern-plates mounted thereon, and means for imparting to said turret step-by-step rotary movements, of a series of heating burners each disposed beneath one of said pattern-plates in the intervals between movements of the turret, fuel-supply pipes connected with said burners, valves in said fuel-supply pipes, and automatically acting means for reducing the fuel-supply of said burners during the travel of the turret.

25. In a molding machine, the combination with a rotary turret, a plurality of pattern-plates mounted thereon, and means for imparting to said turret step-by-step rotary movements, of a series of stationary heating burners each disposed beneath one of said pattern-plates in the intervals between movements of the turret, depending cleaning brushes carried by the turret intermediate said pattern-plates and adapted to maintain the operative face of an adjacent press-platen free from sand, valved fuel-supply pipes connected with said burners, and means whereby the flames of the several burners are reduced during the passage of such brushes over the same.

26. In a molding machine, the combination with a rotary turret, a plurality of flask-carriers mounted thereon, pattern-carriers sustained by said flask-carriers, and a pattern-plate sustained by each of said pattern-carriers, of a series of cleaning brushes with depending bristles interposed between and moving with said flask-carriers and adapted to clean the surface of an adjacent press-platen preparatory to its engagement with each of said pattern-carriers.

27. In a molding machine, the combination with a rotary flask-sustaining turret, means for imparting step-by-step movements thereto, and a flask filling apparatus, of a scraper movably mounted upon a fixed support and adapted to remove sand from the face of the turret and automatically acting means for deflecting said scraper to permit the flasks to pass by it.

28. In a molding machine, the combination with a rotary flask-sustaining turret, means for imparting step-by-step operative movements thereto, and a flask-filling apparatus, of a scraper movably mounted upon a fixed support and adapted to be deflected from normal position by engagement with a flask upon the turret, and a spring for yieldingly holding said scraper in normal position inclined to the outer edge of the turret.

In testimony whereof, I have signed my name to this specification, in the presence of two subscribing witnesses.

ALEXANDER McCARTE.

Witnesses:
D. P. BUNIE,
W. P. STEWART.